(12) United States Patent
Pinhanez

(10) Patent No.: US 8,121,890 B2
(45) Date of Patent: Feb. 21, 2012

(54) METHOD AND SYSTEM FOR AUTOMATED SERVICE CLIMATE MEASUREMENT BASED ON SOCIAL SIGNALS

(75) Inventor: Claudio Santos Pinhanez, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 11/675,892

(22) Filed: Feb. 16, 2007

(65) Prior Publication Data

US 2008/0040199 A1 Feb. 14, 2008

Related U.S. Application Data

(60) Provisional application No. 60/812,221, filed on Jun. 9, 2006.

(51) Int. Cl.
*G06F 17/30* (2006.01)
(52) U.S. Cl. .................. 705/7.42; 705/7.41
(58) Field of Classification Search .............. 705/10, 705/11, 7.42, 7.41
See application file for complete search history.

(56) References Cited

U.S. PATENT DOCUMENTS

| | | | | |
|---|---|---|---|---|
| 5,638,489 | A * | 6/1997 | Tsuboka ................ | 704/256 |
| 6,363,145 | B1 * | 3/2002 | Shaffer et al. .......... | 379/265.02 |
| 6,542,602 | B1 * | 4/2003 | Elazar .................... | 379/265.06 |
| 6,868,154 | B1 * | 3/2005 | Stuart et al. ........... | 379/265.06 |
| 6,959,078 | B1 * | 10/2005 | Eilbacher et al. ..... | 379/265.03 |
| 7,222,075 | B2 * | 5/2007 | Petrushin ............... | 704/270 |
| 7,542,903 | B2 * | 6/2009 | Azara et al. ........... | 704/257 |
| 7,665,024 | B1 * | 2/2010 | Kondziela .............. | 715/745 |
| 2003/0078782 | A1 * | 4/2003 | Blair ..................... | 704/270.1 |
| 2003/0154072 | A1 * | 8/2003 | Young et al. ........... | 704/9 |
| 2005/0114133 | A1 * | 5/2005 | Mark et al. ............ | 704/251 |
| 2005/0238161 | A1 * | 10/2005 | Yacoub et al. ........ | 379/265.06 |
| 2006/0136282 | A1 * | 6/2006 | Furin et al. ........... | 705/10 |
| 2006/0265089 | A1 * | 11/2006 | Conway et al. ....... | 700/94 |

OTHER PUBLICATIONS

Froehle, Craig M. "Service Personnel, Technology, and Their Interaction in Influencing Customer Satisfaction." Decision Sciences, vol. 37, No. 1, p. 5, Feb. 2006.*
Nancarrow, Clive et al. "Rapport in Telemarketing—Mirror, Mirror on the Call?" Marketing Intelligence & Planning, vol. 16, No. 1, p. 12, 1998.*
Alex Pentland, "Social Dynamics: Signals and Behavior" MIT Media Laboratory Technical Note 579, appears ICDL '04, San Diego, Oct. 20-22.
Alex Pentland, "Socially Aware Computation and Communication" Published by the IEEE Computer Society, Mar. 2005 pp. 63-70.

* cited by examiner

*Primary Examiner* — Susanna M Meinecke Diaz
(74) *Attorney, Agent, or Firm* — F. Chau & Associates, LLC; Daniel P. Morris, Esq.

(57) ABSTRACT

A computer-implemented method for measuring a system includes providing an automated service climate measurement system (ASCMS) comprising an evaluation function, receiving customer input by the ASCMS, measuring a service climate variable of the customer input, determining a social-signal feature of the customer input, correlating the social-signal feature with the service climate variable, and determining a value of the evaluation function based on the correlation of the feature to the service climate variable.

6 Claims, 5 Drawing Sheets

METHOD AND SYSTEM FOR AUTOMATED SERVICE CLIMATE MEASUREMENT BASED ON SOCIAL SIGNALS

CROSS-REFERENCE TO RELATED APPLICATION

This application claims the benefit of Provisional Application No. 60/812,221 filed on Jun. 9, 2006 in the United States Patent and Trademark Office, the contents of which are herein incorporated by reference in its entirety.

BACKGROUND OF THE INVENTION

1. Field of the Invention

The present disclosure relates to customer service, and more particularly to a system and method for measuring a service.

2. Description of Related Art

Although services constitute a important driver of the world economy, efforts to improve service quality and customer satisfaction for competitive advantage are currently constrained by the difficulty of manual, human-intensive methods for measuring service climate indicators such as service quality, customer satisfaction with products and services, service agent competency and motivation, etc. While in today's manufacturing environment there are a plethora of methods to automatically measure production quality and climate, service industries still rely on quality data obtained through surveys or human analysis of service encounters.

Referring to FIG. 1, an architecture of a Service Climate Measurement System (SCMS) based on surveys or human analysis of service interactions uses survey or human-analyzed data to obtain the measurements. These surveys and analysis are prone to error, introduced by, among other things, the users gathering the data.

Therefore, a need exists for system and method for automatic measurement of service.

SUMMARY OF THE INVENTION

According to an embodiment of the present disclosure, a system for measuring a service comprises a computer-readable program code embodying an automated service climate measurement system (ASCMS), a processor for processing the ASCMS and customer input to determine a measure of service climate experienced by the customer, and a service system for receiving the measure of service climate and adjusting the service according to the measure.

According to an embodiment of the present disclosure, a computer-implemented method for measuring a system includes providing an automated service climate measurement system (ASCMS) comprising an evaluation function, receiving customer input by the ASCMS and measuring service climate variables of the customer input, by determining social-signal features of the customer input and determining a value of the evaluation function based on the correlation of the social-signal features to the service climate variables.

According to an embodiment of the present disclosure, a computer readable medium is provided embodying instructions executable by a processor to perform a method for measuring a system. The method includes providing an automated service climate measurement system (ASCMS) comprising an evaluation function, receiving customer input by the ASCMS, measuring a service climate variable of the customer input, determining a social-signal feature of the customer input, correlating the social-signal feature with the service climate variable, and determining a value of the evaluation function based on the correlation of the social-signal feature to the service climate variable.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a computer system analyzes social signals generated by customers of a service such as call centers, automatic bank tellers, or hotel check-in desks and produces one or more measures of the quality of a service interaction as perceived by the customers and their satisfaction with different aspects of the service encounter. These service climate measures are obtained by correlating measured features of the social signals sent by customers and service agents with measurements of service quality, customer satisfaction, agent motivation, and other service climate indicators obtained by surveys and interviews.

Figure 1:
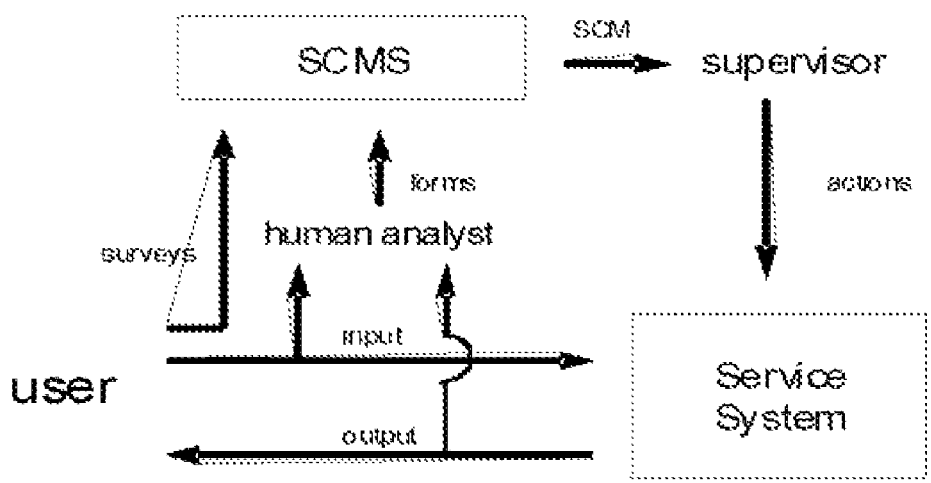
FIG. 1 is a diagram, of a Service Climate Measurement Systems (SCMS)
Figure 2:
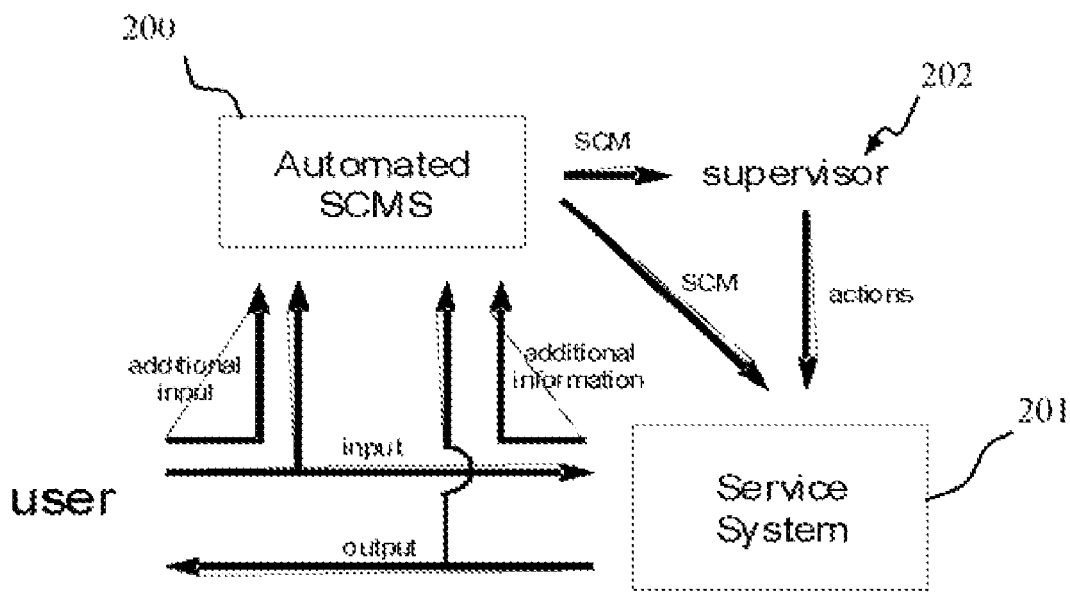
FIG. 2 is a diagram of an Automated Service Climate Measurement System (ASCMS) according to an embodiment of the present disclosure.

Referring to FIG. 2, an Automated Service Climate Measurement System (ASCMS) 200 analyses input such as digital records of service interactions. The digital records may be, for example, telephone calls, text sent by e-mail, service logs, and the like. The ASCMS 200 processes the information on the recordings, and determines a measure for service quality, customer satisfaction, etc. by matching the processed information with pre-computed correlation data. The system may analyze digital recordings of the customer, the service provider or its agent, or both. Examples of sources for these digital recordings may include telephone calls, face-to-face conversations, typed text, text-based computer chatting, video of customer or the agent, walking and browsing patterns in the service environment, etc. These records are indicated as "input" and "additional input" in FIG. 2.

According to an embodiment of the present disclosure, automatic measurements of service climate are performed by a computer system implementing the ASCMS 200. This can diminish the cost of measuring service climate, as well as improving its quality, and allow real-time monitoring and use of the service climate measurements.

The ASCMS 200 monitors the way in which people interact with each other, wherein a multitude of signals are sent, verbal and non-verbal, to show their current state of mind in order to enhance the communication with their partners. These signals are known in the psychology literature as social signals. Examples are facial expressions, gestures, tone of voice, prosodic style, word selection and usage, eagerness to interrupt the other speakers, etc.

Social signals can occur when people are conversing to each other, using all kinds of media such as face-to-face, telephone, mail, e-mail, Internet chatting, or video-conferencing, among many others. Further, people send social signals when interacting with computers.

Statistical processing of conversations allows for the detection of either the social signals themselves, or consequences of them, or both.

Automatic processing of social signals for measuring service climate variables such as customer satisfaction with products and support, service quality, or agent motivation, among others may be implemented in a computer-based system that processes conversational records, in real-time or not, between users and service systems such as call centers, automatic bank tellers, or hotel check-in desks. These records are indicated as "input" and "additional input" in FIG. 2.

FIG. 2 illustrates the ASCMS 200 based on social signals according to an embodiment of the present invention. The ASCMS 200 processes input of actual conversation of the user with a service system 201 and its human agents, and provides the service climate measurements to the supervisor 202 of the service system 201.

There are multiple ways to implement the ASCMS 200. For example, a computer system may implement the ASCMS for processes a conversational record (as it progresses, or the whole record), or a set of conversational records, detecting and recognizing features associated with specific social signals. The ASCMS 200 includes an evaluation function F that takes these sets of social-signal features and, based on their values, produces estimates for the values of service climate variables.

Figure 7:
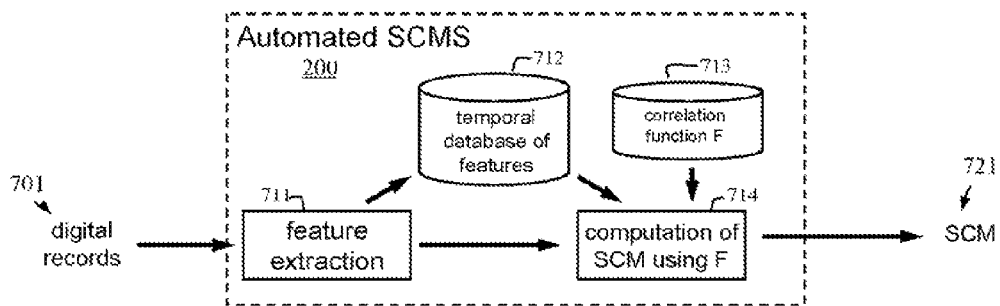
FIG. 7 is a diagram illustrating a possible architecture of an ASCMS system.

FIG. 7 shows an embodiment of the ASCMS system 200. The ASCMS system, takes as input digital records 701 which may be telephone calls, e-mail conversations, chat logs, etc., as well as information recorded by the agent such as problem description, sales data, etc. These records are fed to a feature extraction system which processes using standard techniques the digital records and extract speech features such as tone of voice, intensity, prosodic contour etc.; and/or text features such as word usage, sentence length, etc.; and/or conversation patterns such as speaker dominance, interplay, etc. The result of feature extraction process is a set of values associated to different features that are sent to the module 714 that computes the SCM using the function F 713. This module 714 applies a previously computed function F that maps features into service climate measures, determining the output of the system, the SCM values 721.

In an alternative embodiment of this disclosure, the ASCMS module 200 includes a database 712 to store previously determined values of the features and uses subsets of the previously determined values as input to the function F to compute the SCM 714.

To develop the evaluation function F, a database of conversational records is gathered, such as telephone calls, e-mail threads, chat logs, etc. 501. During the period(s) covered by the conversational records, the desired service climate variables are measured using methodology such as surveys, human-analyzed forms, etc. 502. These measurements should measure service climate variables related to specific conversational records. The contents of the conversational records database are processed to detect, measure, or recognize features related to social signals such as tone of voice, turn-taking, activity level, stress, etc. 503. This may include features that evaluate the entirety of a record or features that describe how other features evolved through time, such as, for example, by modeling the structure of the conversation through time using a statistical model such as a Bayesian network or a Hidden Markov Model. Optionally, the record database are statistically analyzed with methods such as Principal Component Analysis, to determine the most relevant features in the data and to decrease the number of features to be considered. The features detected in the conversational records in block 503 and, optionally, reduced in number by the processing of block 504, are correlated with the service climate variables measured through surveys and human-analyzed forms 505. If there are features that correlate strongly with service climate variables, a mathematical representational of a function F that maps the strongly correlated features to the SCM variables is created using standard statistical methods 506. This representation of F is stored in the ASCMS module 201, in an appropriately formatted database 713. If no features are determined to be strongly correlated, for instance, if statistical correlation is between −0.8 and 0.8, the method returns to block 503 and try processing using another set of features 507.

Figure 5:
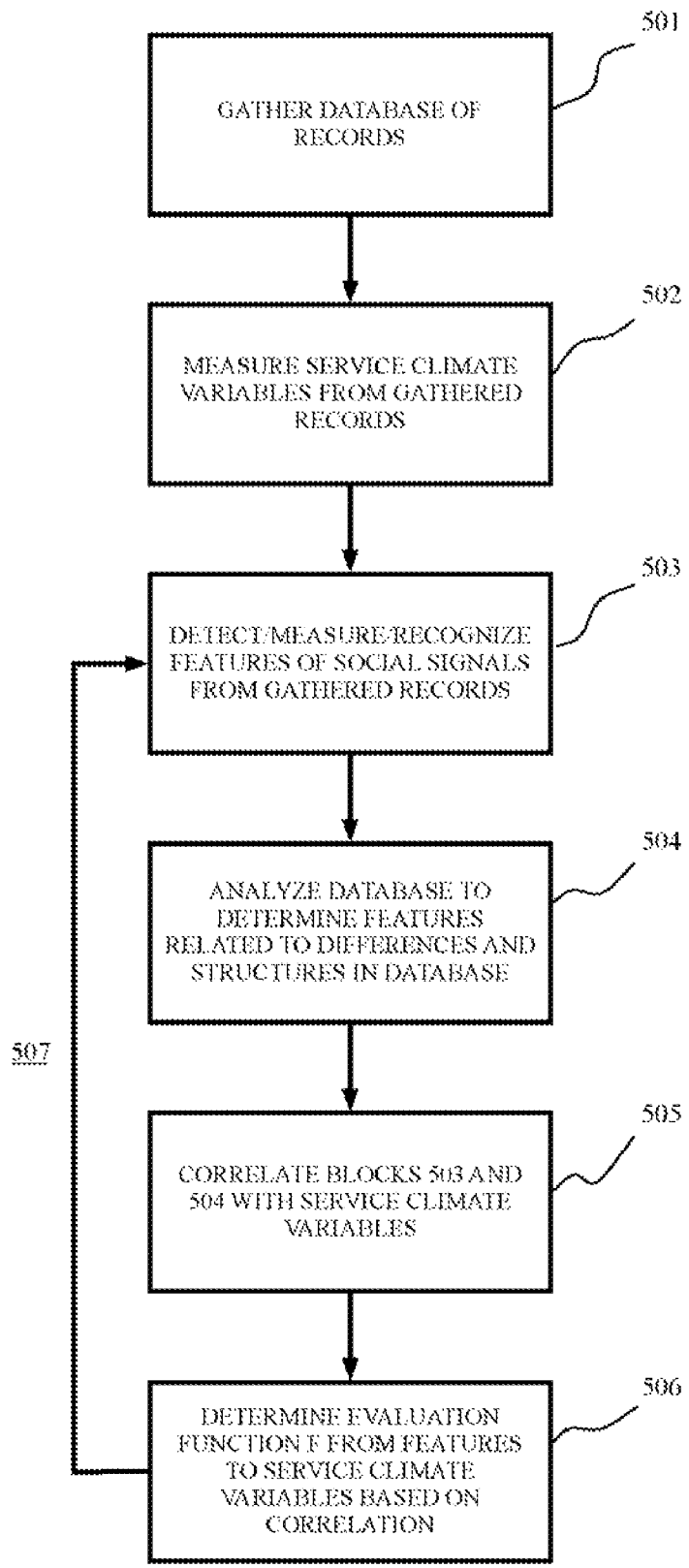
FIG. 5 is the diagram illustrating a method to calculate the function F that maps features calculated from user input to service climate variables measured through surveys or human analysis of service encounters.

The process of determining the correlation function F can be either monitored by a technician or, in some embodiments, completely automated. Also, the correlation function F maps from social-signal features to service climate variables may have to be changed as function of changes in conversational modality, geographical, ethnic, and cultural diversity of the users and agents, release or update of new products or services, or simply as time goes by. The consistency and accuracy of the ASCMS system 200 may be checked and/or updated, in a process similar to described with respect to FIG. 5, using a small set of data collected through surveys or human-analyzed forms.

The measurements of service climate (SCM) provided by an ASCMS can be used in many different ways. As suggested in FIG. 2, SCMs can be sent to a system supervisor 202 that may use the information to take actions to improve the service system. Also SCMs can be sent directly to the service system 201 for logging and future analysis.

Figure 3:
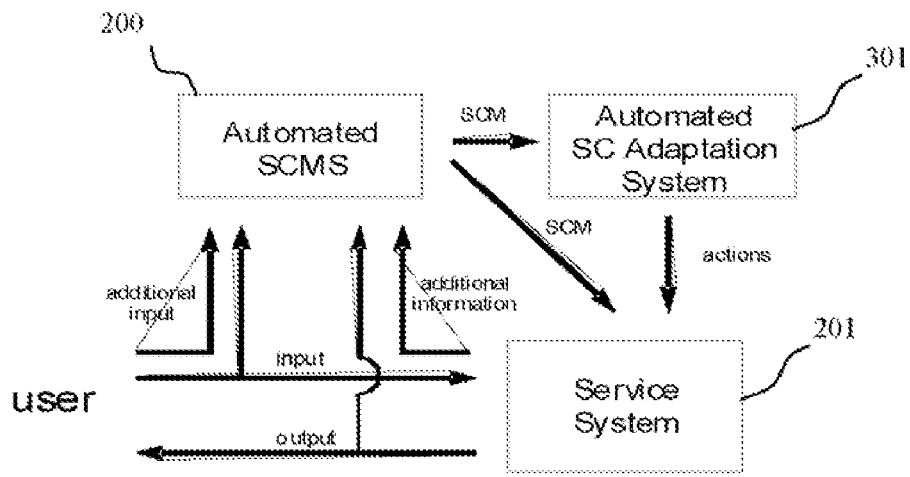
FIG. 3 is a diagram, of an ASCMS with an automated service climate adaptation system according to an embodiment of the present disclosure.

FIG. 3 shows another way to use the SCMs provided by the ASCMS 200. In this case, an automated adaptation system 301 uses the SCMs to generate actions that change the Service System 201 to improve service climate or to increase efficiency. For example, a decline in customer satisfaction may lead to messages being generated to the service agents asking for more attention when dealing with customers. Similarly, an increase in service quality may trigger a message to the service system manager suggesting a change in the service price.

Figure 8:
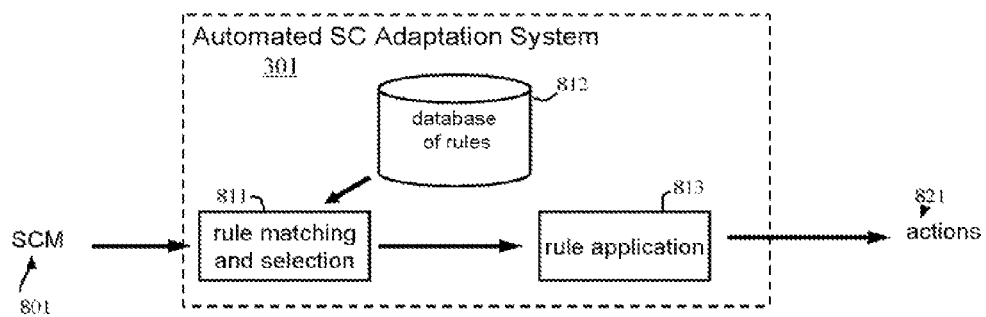
FIG. 8 is a diagram illustrating a possible architecture for an automated service climate adaptation system that receives service climate measurements and automatically generate actions that change the performance of the service system.

In one embodiment of this invention, the architecture of the may follow the diagram in FIG. 8, The SC adaptation system 301 may include a set of action rules stored in a database 812. When SCMs 801 are input into the system, a rule matching and selection module determine which rules in the database 812 have triggering preconditions that match the service climate measures. Those rules are gathered and all of them or a subset of them is selected. The selected rules are then sent to the rule application module 813 which parses the rules and generates the appropriate actions, such as sending e-mails to agents or managers, change parameters and aspects of the service website, send messages to customers, etc.

In an alternative embodiment of the Automated SC Adaptation System, human supervisors are asked to check whether the rules selected by module 811 should in fact be applied.

Figure 4:
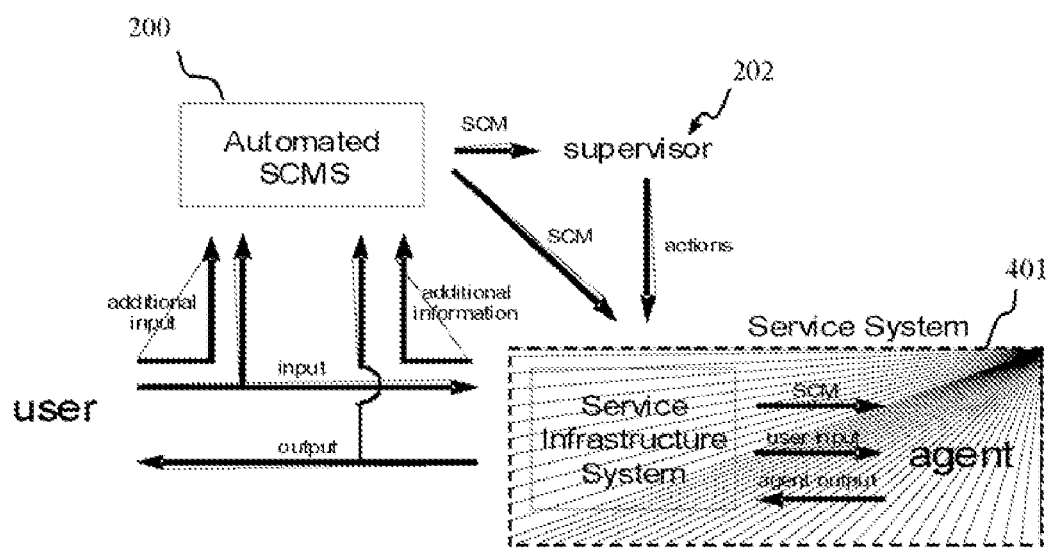
FIG. 4 is a diagram illustrating use of service climate measurements by a service agent during a conversation with a customer according to an embodiment of the present disclosure.

FIG. 4 shows an alternative way to use SCMs. In situations where the evaluation function F is able to provide reasonable estimates of SCMs based on just the initial portions of the conversational record, SCMs can be used to support the activities of a service agent 401 during a conversation. For example, estimates of customer satisfaction, customer anxiety levels, etc. Also, special evaluation functions can be construed to detect likelihood of agreement in a negotiation, or opportunities in mid conversation to suggest a cross or up sale.

The ASCMS 200 is not restricted to service environments based on telephone and other electronically-mediated conversation. By instrumenting and recording other environments where face-to-face conversations happen, such as hotel front-desks, restaurant tables, etc., the same techniques can be employed.

In one embodiment of this specific way to use this invention, an ASCMS can be used in an airport check-in counter, for example, to increase customer satisfaction of business and first-class passengers. Two microphones are used, one for the agent, another pointed to the customer, gathering data about the check-in conversation that is analyzed by the ASCMS. If low levels of customer satisfaction are detected, a message is sent to the flight attendants asking for special care for those passengers. In this situation, the goal of the system is to automatically detect situations where dissatisfaction may be corrected by warning agents to improve service in the next steps of the service chain.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 6:
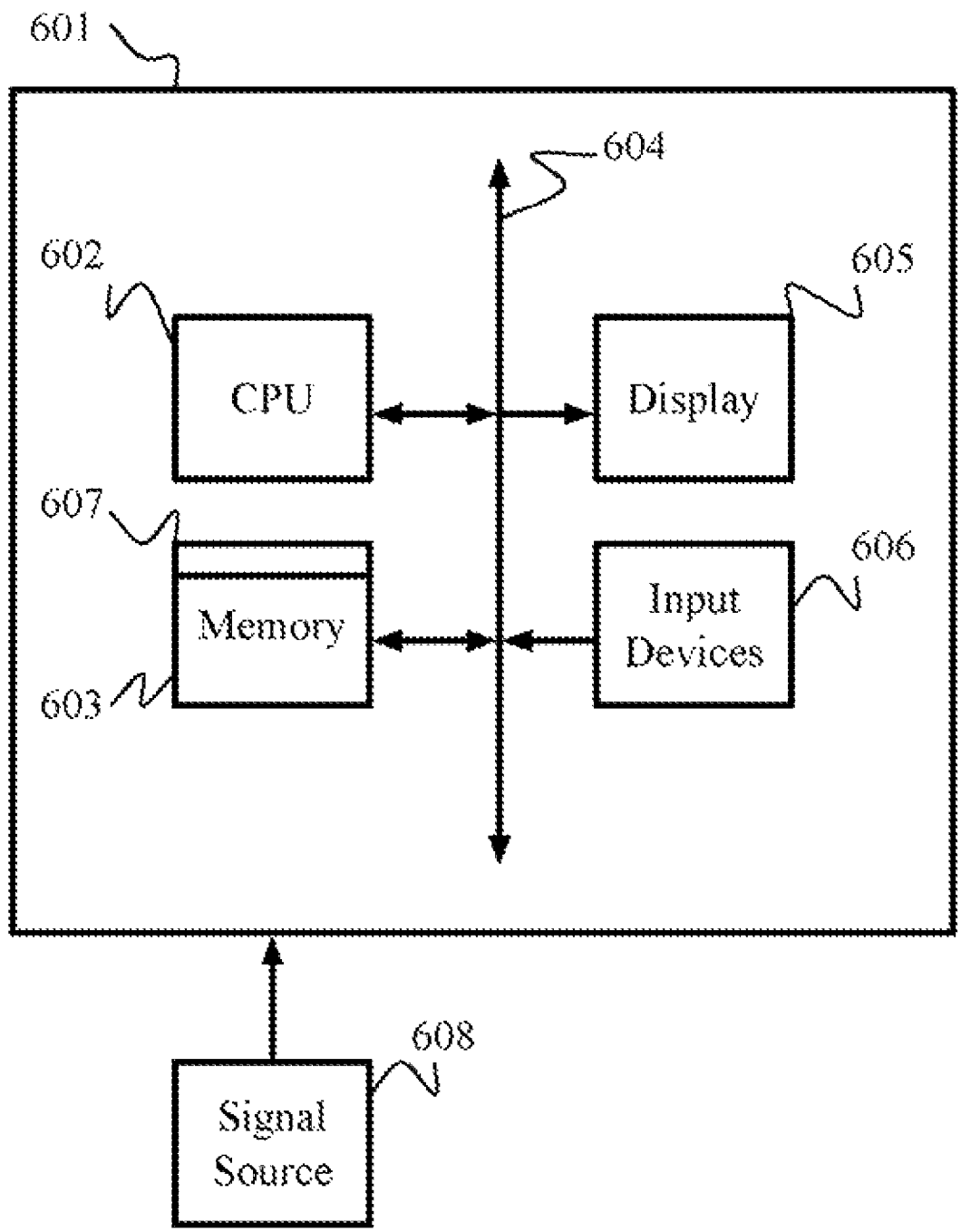
FIG. 6 is a diagram of a computer-system according to an embodiment of the present disclosure.

Referring to FIG. 6, according to an embodiment of the present disclosure, a computer system 601 for measuring a service can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 1007 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for measuring a service, it is noted that modifications and variations can be made by persons skilled in the art in light of the above teachings. It is therefore to be understood that changes may be made in embodiments of the present disclosure that are within the scope and spirit thereof.

What is claimed is:

1. A non-transitory computer readable storage medium embodying instructions executed by a processor to perform a method for measuring quality of service interactions, the method comprising:

providing an automated service climate measurement system (ASCMS) comprising an evaluation function for mapping social-signal features to service climate variables;

receiving a conversational record including the customer conversational record by the ASCMS;

determining a first measure of the customer conversational record as a service climate variable indicating a general quality of the customer conversational record;

determining a second measure of the customer conversational record as a social-signal feature indicating a specific quality of speech in the customer conversational record different than the general quality;

correlating the social-signal feature with the service climate variable;

determining a value of the evaluation function based on the correlation of the social-signal feature to the service climate variable, wherein the value is a measurement of the quality of the service interaction perceived by a customer corresponding to the customer conversational record; and evaluating a set of action rules against the value of the evaluation function for triggering an action.

2. A computer program product for measuring quality of service interactions, the computer program product comprising:

a computer readable storage medium having computer readable program code embodied therewith, the computer readable program code comprising:

computer readable program code configured to provide an automated service climate measurement system (ASCMS) comprising an evaluation function for mapping social-signal features to service climate variables;

computer readable program code configured to receive customer input, including the customer conversational record, by the ASCMS;

computer readable program code configured to measure a service climate variable of the customer input, wherein the service climate variable indicates a general quality of the customer conversational record;

computer readable program code configured to determine a social-signal feature of the customer input, wherein the social-signal feature indicates a specific quality of speech in the customer conversational record different than the general quality;

computer readable program code configured to correlate the social-signal feature with the service climate variable; and computer readable program code configured to determine a value of the evaluation function based on the correlation of the social-signal feature to the service climate variable, wherein the value is a measurement of the quality of the service interaction perceived by a customer corresponding to the customer conversational record; and computer readable program code configured to evaluate a set of action rules against the value of the evaluation function for triggering an action.

3. The computer program product of claim 2, further comprising computer readable program code configured to determine a second social-signal feature of the customer input upon determining that no feature is correlated with the service variable based on a predetermined correlation threshold.

4. The computer program product of claim 2, further comprising computer readable program code configured to extract the social-signal feature from the customer input.

5. The computer program product of claim 2, further comprising computer readable program code configured to retrieve the social-signal feature from a database.

6. The computer program product of claim 2, wherein the ASCMS extracts the social-signal feature from the customer input.

* * * * *